(12) United States Patent
Fujimoto (10) Patent No.: US 8,057,617 B2
(45) Date of Patent: Nov. 15, 2011

(54) METHOD FOR PRODUCING TUBULAR BODY MADE OF FIBER REINFORCED RESIN AND TUBULAR BODY PRODUCED BY METHOD

(75) Inventor: Hiroaki Fujimoto, Hyogo (JP)

(73) Assignee: SRI Sports Limited, Kobe (JP)

( * ) Notice: Subject to any disclaimer, the term of this patent is extended or adjusted under 35 U.S.C. 154(b) by 915 days.

(21) Appl. No.: 12/076,199

(22) Filed: Mar. 14, 2008

(65) Prior Publication Data

US 2008/0311326 A1     Dec. 18, 2008

(30) Foreign Application Priority Data

Jun. 12, 2007   (JP) .................... 2007-155118

(51) Int. Cl.
*B32B 37/00*     (2006.01)
(52) U.S. Cl. ............. 156/188; 156/187; 156/189
(58) Field of Classification Search .......... 156/187, 156/189, 188
See application file for complete search history.

(56) References Cited

U.S. PATENT DOCUMENTS

| | | | | |
|---|---|---|---|---|
| 6,306,047 B1 * | 10/2001 | Kusumoto | ............ | 473/319 |
| 2001/0007836 A1 * | 7/2001 | Atsumi et al. | ............ | 473/319 |
| 2002/0082112 A1 * | 6/2002 | Unosawa et al. | ............ | 473/318 |
| 2007/0117647 A1 * | 5/2007 | Nakajima | ............ | 473/316 |

FOREIGN PATENT DOCUMENTS

| | | | |
|---|---|---|---|
| JP | 2-1888232 A | * | 7/1990 |
| JP | 05-177020 | | 7/1993 |
| JP | 8-131588 A | | 5/1996 |
| JP | 11-76478 A | * | 3/1999 |
| JP | 2001-231900 | | 8/2001 |
| JP | 2003-169871 | | 6/2003 |
| JP | 2005-176960 A | * | 7/2005 |
| JP | 2007-117306 A | * | 5/2007 |

OTHER PUBLICATIONS

Machine translation of Japanese Patent 2007-117306, date unknown.*

* cited by examiner

*Primary Examiner* — Jeff Aftergut
(74) *Attorney, Agent, or Firm* — Birch, Stewart, Kolasch & Birch, LLP (57) ABSTRACT

A method for producing a tubular body includes a step of winding at least one of winding bias prepregs, at least one of straight prepregs, and at least one of hoop prepregs round a core. At the winding step, after the hoop prepreg and/or the hoop prepreg are adherently layered in advance on a base prepreg consisting of the bias prepreg or the straight prepreg to form a laminate and/or a laminate, the laminate and/or the laminate are wound on the core so that the hoop prepreg and/or the hoop prepreg are wound on the core integrally with the base prepreg or the base prepreg.

1 Claim, 4 Drawing Sheets

[Prior Art]

METHOD FOR PRODUCING TUBULAR BODY MADE OF FIBER REINFORCED RESIN AND TUBULAR BODY PRODUCED BY METHOD

This nonprovisional application claims priority under 35 U.S.C. §119(a) on Patent Application No(s). 2007-155118 filed in Japan on Jun. 12, 2007, the entire contents of which are hereby incorporated by reference.

BACKGROUND OF THE INVENTION

1. Field of the Invention

The present invention relates to a method for producing a tubular body made of fiber reinforced resin and the tubular body, made of the fiber reinforced resin, which is produced by the method. More particularly, the present invention is intended to prevent a hoop prepreg of the tubular body from being defectively layered on a base prepreg.

2. Description of the Related Art

In recent years, as a material of the tubular body such as a golf club shaft, a fishing rod, and the like, fiber reinforced resin such as carbon prepreg which is lightweight and has a high specific strength and a high rigidity is mainly used.

The tubular body made of the fiber reinforced resin is formed by layering fiber reinforced prepregs one upon another. The fiber reinforced prepregs have different characteristics according to the orientation direction of reinforcing fibers thereof as described below.

In a bias prepreg whose reinforcing fibers are inclined to the axial direction of the tubular body, the reinforcing fibers extend spirally. Therefore the bias prepreg is capable of enhancing mainly the torsional rigidity and torsional strength of the tubular body.

In a straight prepreg whose reinforcing fibers are disposed almost parallel with the axial direction of the tubular body, the reinforcing fibers extend in the axial direction of the tubular body. Therefore the straight prepreg is capable of enhancing mainly the bending rigidity and bending strength of the tubular body.

In a hoop prepreg whose reinforcing fibers are disposed almost perpendicularly to the axial direction of the tubular body, the reinforcing fibers extend in the circumferential direction of the tubular body. Therefore the straight prepreg is capable of enhancing mainly the crushing rigidity and crushing strength of the tubular body.

In producing the tubular body, in a known technique, a rigidity and a strength necessary for the tubular body are adjusted by using the bias prepreg, the straight prepreg, and the hoop prepreg in combination without increasing the weight of the tubular body.

Figure 5:
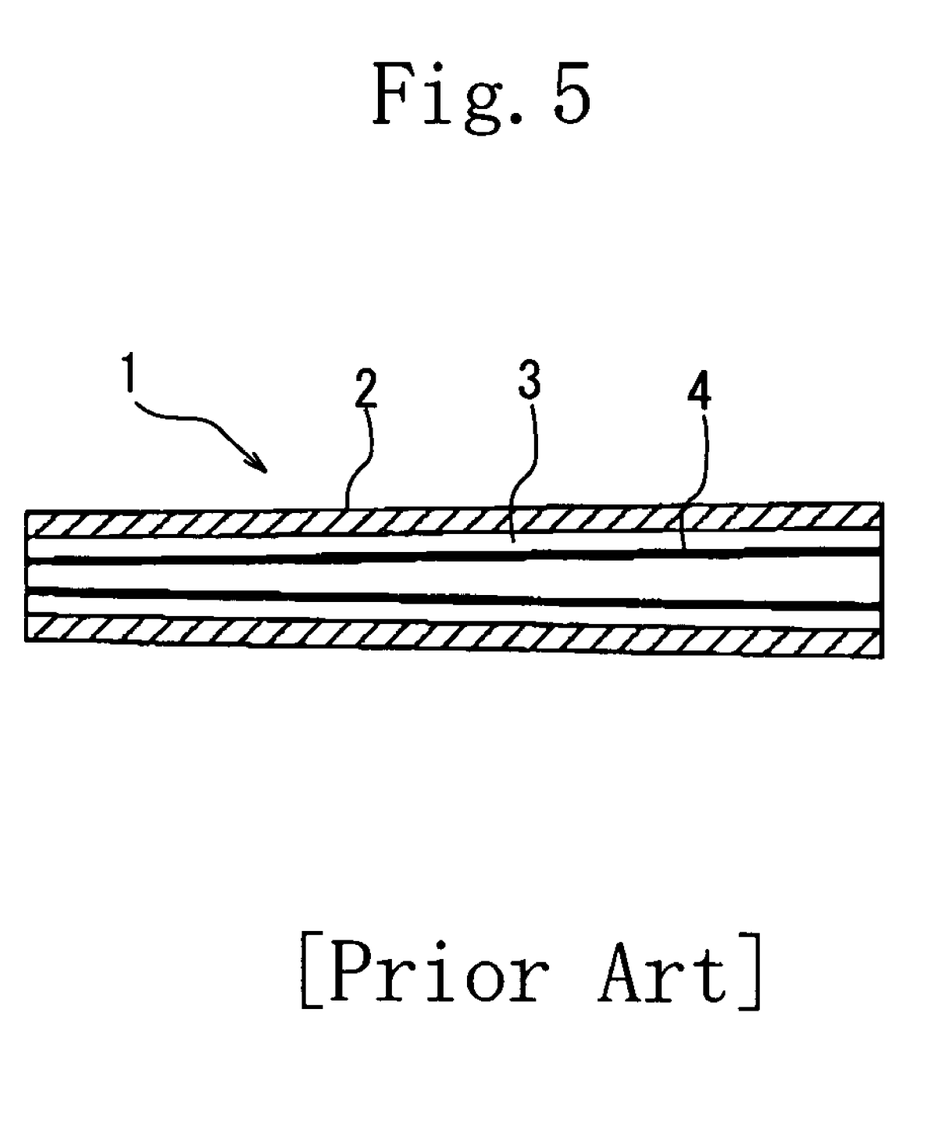
FIG. 5 is a sectional view showing a conventional construction in which prepregs are layered one upon another.

For example, as shown in FIG. 5, the golf club shaft 1 disclosed in Japanese Patent Application Laid-Open No. 8-131588 (patent document 1) has the bias layer 2 consisting of the bias prepreg disposed at the outer side, the straight layer 3 consisting of the straight prepreg disposed inward from the bias layer 2, and the hoop layer 4 consisting of the hoop prepreg disposed inward from the straight layer 3. Description is made in the specification that the construction of the golf club shaft 1 of the patent document 1 is capable of enhancing the torsional rigidity and bending rigidity thereof without increasing the weight thereof.

But when the hoop prepreg is wound round the core, the hoop prepreg is restrained from being curved by the elasticity of the reinforcing fiber extended in the circumferential direction of the golf club shaft 1. Thus it is difficult to wind the hoop prepreg round the core. Therefore it is difficult to adherently layer the hoop layer on the underlayer, and an end of the hoop prepreg is liable to peel off the underlayer.

When the peel-off occurs, the hoop layer lifts and the hoop prepreg bends in a work of overlaying the outer layer on the hoop layer, and in addition, air is collected in a portion where the hoop layer has lifted. Thereby the hoop layer has a low strength and there occurs a variation in the characteristic of the tubular body, which leads to deterioration of the quality thereof. Further it is necessary to perform a work of adhering the defective portion of the hoop prepreg to the underlayer again, which leads to deterioration of the productivity thereof.

To solve the above-described problem, in a known technique, the straight layer is overlaid on the hoop layer and the number of turns (number of plies) of the straight layers is increased to prevent defective layering of the hoop layer by the wrapping effect of the straight layer. But in recent years, the tubular body such as the golf club shaft is strongly demanded to have a lightweight. Thus it is necessary not to form the straight layer excessively. Further to prevent the tubular body from deteriorating its strength by making it lightweight, it is conceivable that the number of the hoop layers inevitably increases. Thus the number of turns of the straight layers is demanded to be equal to that of the hoop layers at most.

Patent document 1: Japanese Patent Application Laid-Open No. 8-131588

SUMMARY OF THE INVENTION

The present invention has been made to solve the above-described problems. Therefore it is an object of the present invention to provide a method for producing a tubular body, made of fiber reinforced resin, in which peel-off of a hoop prepreg can be prevented without increasing the weight of the tubular body to improve the quality and productivity thereof. It is another object of the present invention to provide the tubular body produced by the producing method.

To achieve the above-described object, the present invention provides a method for producing a tubular body comprising a laminate of prepregs each consisting of a matrix resin and reinforcing fibers impregnated with the matrix resin.

The method includes a step of winding round a core bias prepregs in which orientation directions of reinforcing fibers incline to an axis of the tubular body, winding straight prepregs in which orientation directions of reinforcing fibers are parallel with the axis of the tubular body, and hoop prepregs in which orientation directions of reinforcing fibers are disposed perpendicularly to the axis of the tubular body.

At the winding step, after at least one of the hoop prepregs (hereafter is called layered-hoop prepreg) is adherently layered in advance on at least one base prepreg consisting of one of the bias prepregs or one of the straight prepregs to form one or more laminates, at least one of the laminates is wound on the core so that at least one of the hoop prepregs is wound on the core integrally with at least one of the base prepregs.

In the method of the present invention for producing the tubular body, the hoop prepreg which is difficult to be wound round the core is adherently layered beforehand on the straight prepreg or the bias prepreg which can be easily wound round the core to form the laminate. Thereafter the laminate is wound round the core. Thus unlike a case in which the hoop prepreg is singly wound round the core, it is possible to prevent the hoop prepreg from being defectively adherently layered on the base prepreg and thus prevent the hoop prepreg from peeling off the base prepreg. Thereby it is possible to improve the quality and productivity of the tubular body without increasing the number of turns of the base prepreg and the weight of the tubular body.

It is possible to adherently layer the hoop prepreg on both sides of the straight prepreg or the bias prepreg in advance to form the laminate.

When a plurality of the hoop prepregs is used, it is preferable to layer all the hoop prepregs on the base prepregs respectively so that the laminate is formed.

Because the straight prepreg can be wound round the core more easily than the bias prepreg, it is preferable to use the straight prepreg as the base prepreg constructing the laminate.

Further it is preferable to wind the laminate round the core in such a way that the base prepreg is disposed outward from the hoop prepreg in consideration of the wrapping effect to be brought about by the base prepreg.

The hoop prepreg of the present invention means a prepreg in which the intersection angle formed between the arrangement directions of the fibers thereof and the axial direction of the tubular body is in the range from 80 to 100 degrees.

The straight prepreg of the present invention means a prepreg in which the intersection angle formed between the arrangement directions of the fibers thereof and the axial direction of the tubular body is in the range from −10 to +10 degrees.

The bias prepreg of the present invention means a prepreg in which the intersection angle formed between the arrangement directions of the fibers thereof and the axial direction of the tubular body is more than 10 degrees and less than 80 degrees and more than −10 and less than −80 degrees.

In the layered-hoop prepreg adherently layered on the base prepreg, at least one of both edges of the layered-hoop prepreg in the axial direction of the tubular body and a termination edge of the hoop prepreg in a hoop prepreg-winding direction is disposed coincidentally with or inward from a peripheral edge of the base prepreg.

Thereby at the edge of the hoop prepreg in the axial direction of the tubular body and/or the termination edge of the hoop prepreg in the hoop prepreg-winding direction where the hoop prepreg is liable to peel from the base prepreg, the base prepreg is capable of displaying its anchoring effect. Thereby it is possible to facilitate a winding work and securely prevent the hoop prepreg from being defectively adherently layered on the base prepreg.

It is favorable that at all of the three positions of the layered-hoop prepreg, namely, at both edges thereof in the axial direction of the tubular body and the termination edge thereof in the hoop prepreg-winding direction, the layered-hoop prepreg is disposed coincidentally with or inward from the peripheral edge of the base prepreg. It is more favorable that in addition to the above-described three positions, at an initial edge of the hoop prepreg in the layered-hoop prepreg-winding direction, the layered-hoop prepreg is disposed coincidentally with or inward from the peripheral edge of the base prepreg. This is for the following reason: If only the initial edge of the layered-hoop prepreg in the layered-hoop prepreg-winding direction is positioned outward from the base prepreg, only the rigidity of the initial edge of the layered-hoop prepreg in the layered-hoop prepreg-winding direction becomes small. Consequently a stress concentrates at the initial edge of the layered-hoop prepreg, and the layered-hoop prepreg is liable to bend or curve.

It is more favorable to dispose the peripheral edge of the layered-hoop prepreg inward from that of the base prepreg than to dispose the peripheral edge thereof coincidentally with that of the base prepreg so that the peripheral portion of the base prepreg is capable of effectively displaying its anchoring effect to a high extent and that the hoop prepreg can be securely prevented from being defectively adherently layered on the base prepreg.

The peripheral edge of the layered-hoop prepreg is spaced at an interval of not less than 1 mm, favorably not less than 3 mm, more favorably not less than 5 mm, and most favorably not less than 10 mm from the peripheral edge of the base prepreg. By spacing the peripheral edge of the layered-hoop prepreg from that of the base prepreg at the above-described interval, the base prepreg is capable of sufficiently displaying its anchoring effect, and a stress can be prevented from concentrating on the peripheral edge of the layered-hoop prepreg. Thereby it is possible to prevent the tubular body from being bent or damaged.

When the peripheral edge of the layered-hoop prepreg is spaced from that of the base prepreg at a very large interval, the length of the layered-hoop prepreg becomes short. Thereby the crushing rigidity of the tubular body/the strength thereof becomes small or the base prepreg becomes unnecessarily large. Thereby the weight of the base prepreg increases. Therefore the peripheral edge of the layered-hoop prepreg is spaced from that of the base prepreg at an interval of not more than 50 mm, favorably not more than 30 mm, and more favorably not more than 20 mm.

The present invention provides a tubular body produced by using the above-described method. Both edges of the layered-hoop prepreg in the axial direction of the tubular body are disposed inward from both ends of an end product of the tubular body in the axial direction thereof. This is for the reason described below: When the edge of the hoop prepreg in the axial direction of the tubular body is disposed at the end of the tubular body, the edge of the hoop prepreg peels from the base layer to the highest extent. In addition, an end product such as a golf club shaft, a fishing rod, and the like is produced by cutting the tubular body at a necessary position near both ends thereof because the length of the tubular body is set a little longer than that of the end product. Thus in the state of the end product formed after both ends of the tubular body are cut, the edge of the hoop prepreg in the axial direction of the tubular body is required not to be positioned at the end of the end product.

In setting the length of the layered-hoop prepreg shorter than the full length of the tubular body, it is preferable to cut the edge of the layered-hoop prepreg in the axial direction of the tubular body obliquely to the axial direction of the tubular body. Thereby it is possible to lessen the level difference between the layered-hoop prepreg and the base prepreg after the prepregs are molded. Therefore it is possible to prevent a stress from concentrating on both edges of the hoop layer and thereby prevent the tubular body from lowering in its strength.

It is preferable to set a thickness of the layered-hoop prepreg to a range from 0.03 to 0.06 mm.

The reason the thickness of the layered-hoop prepreg is set to the range from 0.03 to 0.06 mm is as follows: If the thickness of the layered-hoop prepreg is set to less than 0.03 mm, the layered-hoop prepreg is so thin that the crushing rigidity of the tubular body/the strength thereof is low. If the thickness of the layered-hoop prepreg is set to more than 0.06 mm, the layered-hoop prepreg is so thick that it is difficult to layer the layered-hoop prepreg on the base prepreg, and thus the edge of the layered-hoop prepreg is liable to adhere to the base prepreg insufficiently.

It is preferable that the tensile modulus of elasticity of the reinforcing fiber of the layered-hoop prepreg is set to a range from 30 to 80 ton/mm². The tensile modulus of elasticity is measured in conformity to JISR7601:1986 "method of examining carbon fiber".

The reason the tensile modulus of elasticity of the reinforcing fiber of the layered-hoop prepreg is set to the range from 30 to 80 ton/mm² is as follows: If the tensile modulus of elasticity of the reinforcing fiber thereof is less than 30 ton/mm², the crushing rigidity of the layered-hoop prepreg/the strength thereof cannot be obtained at a necessary ratio. If the tensile modulus of elasticity of the reinforcing fiber thereof is more than 80 ton/mm², the elasticity of the reinforcing fiber is so high that it is difficult to layer the layered-hoop prepreg on the base layer.

It is favorable that the resin content of the layered-hoop prepreg and/or that of the base prepreg are set to a range from 30 to 40%.

If the resin content of the layered-hoop prepreg and/or that of the base prepreg are less than 30%, the layered-hoop prepreg has a low adhesion to the base prepreg. If the resin content of the layered-hoop prepreg and/or that of the base prepreg are more than 40%, the hoop prepreg is so thick that the weight thereof increases and the level difference between the layered-hoop prepreg and the base prepreg becomes large. Thereby a stress concentrates on the edge of the layered-hoop prepreg and the tubular body looks unfavorable.

It is more favorable that the resin content of the layered-hoop prepreg and that of the base prepreg are set to the range from 30 to 40%.

In the present invention, five or more hoop prepregs may be used. But in consideration of a favorable balance between the restraint of an increase in the weight of the tubular body and the maintenance of the bending strength as well as the torsional strength, it is favorable to use one to four hoop prepregs, more favorable to use one to three hoop prepregs, and most favorable to use one to two hoop prepregs.

It is favorable to use two to eight bias prepregs and more favorable to use four to six bias prepregs. If less than two bias prepregs are used, the torsional rigidity of the tubular body/the strength thereof becomes low. If one bias prepreg is used, the torsional rigidity of the tubular body becomes unsymmetrical. If not less than eight bias prepregs are used, the ratio of the straight prepreg and that of the hoop prepreg to the limited entire weight of the tubular body are so low that both the bending rigidity of the tubular body/the strength thereof and the crushing rigidity of the tubular body/the strength thereof become low.

It is favorable to use one to eight straight prepregs, more favorable to use two to six straight prepregs, and most favorable to use two to four straight prepregs. If less than one straight prepreg is used, not only the bending rigidity of the tubular body/the strength thereof, but also the torsional rigidity of the tubular body/the strength thereof is low. If not less than eight straight prepregs are used, the number of the straight prepregs is so large that the workability in forming the tubular body is low, and the production cost thereof is high.

In applying the present invention to the golf club shaft, it is preferable that the value of the weight (g) of the tubular body/the length (mm) of the golf club shaft is not less than 0.025 g/mm nor more than 0.050 g/mm. If the above ratio is less than 0.025 g/mm, it is impossible to make the tubular body of an existing material having a high strength and provide the tubular body with a strength at which the tubular body is capable of withstanding use, even though the tubular body can be made of the existing material having a high strength. If the above ratio is more than 0.050 g/mm, it is impossible to make the golf club shaft lightweight. The lower limit of the weight of the tubular body per unit length thereof is not less than 0.026 g/mm and favorably not less than 0.027 g/mm. The upper limit of the weight of the tubular body per unit length thereof is not more than 0.048 g/mm and favorably not more than 0.045 g/mm.

When the tubular body of the present invention is applied to the golf club shaft, it is preferable that the length of the tubular body is set to not less than 460 mm nor more than 1220 mm in conformity to the formal rule.

As reinforcing fibers for the prepreg, carbon fiber is preferable because it has a small specific gravity and a high modulus of elasticity and strength. In addition, fibers used as high-performance reinforcing fibers can be used as the reinforcing fiber. For example, it is possible to use glass fiber, aramid fiber, boron fiber, alumina fiber, graphite fiber, and silicon carbide fiber.

As the matrix resin for the prepreg, thermosetting resin and thermoplastic resin can be used. In consideration of the strength and rigidity necessary, the thermosetting resin is preferable.

The following thermosetting resins can be used: epoxy resin, unsaturated polyester resin, phenol resin, melamine resin, urea resin, diallyl phthalate resin, polyurethane resin, polyimide resin, and silicon resin. Of these resins, the epoxy resin can be preferably used.

The following thermoplastic resins can be used: polyamide resin, saturated polyester resin, polycarbonate resin, ABS resin, polyvinyl chloride resin, polyacetal resin, polystyrene resin, polyethylene resin, polyvinyl acetate resin, AS resin, methacrylate resin, polypropylene resin, and fluorocarbon resin. Of these resins, the polyamide resin can be preferably used.

As described above, in the present invention, the hoop prepreg which is difficult to be wound round the core is adherently layered beforehand on the base prepreg consisting of the straight prepreg or the bias prepreg which can be easily wound round the core to form the laminate. Thereafter the laminate is wound round the core. Thus it is possible to prevent the hoop prepreg from being defectively adherently layered on the base prepreg and thus the hoop prepreg from peeling off the base prepreg without increasing the number of turns of the base prepreg. Thereby it is possible to improve the strength and productivity of the tubular body without increasing the weight thereof.

In the layered-hoop prepreg adherently layered on the base prepreg, at least one of both edges of the layered-hoop prepreg in the axial direction of the tubular body and the termination edge of the layered-hoop prepreg in the layered-hoop prepreg-winding direction is disposed coincidentally with or inward from the peripheral edge of the base prepreg. Thereby at the edge of the tubular body in the axial direction thereof, the base prepreg is capable of displaying its anchoring effect. Thereby it is possible to securely prevent the hoop prepreg from being defectively adherently layered on the base prepreg.

DETAILED DESCRIPTION OF THE PREFERRED EMBODIMENTS

An embodiment of the present invention is described below with reference to the drawings.

FIGS. 1 through 4 show a tubular body 10, for a golf club shaft, of a first embodiment of the present invention.

Figure 1:
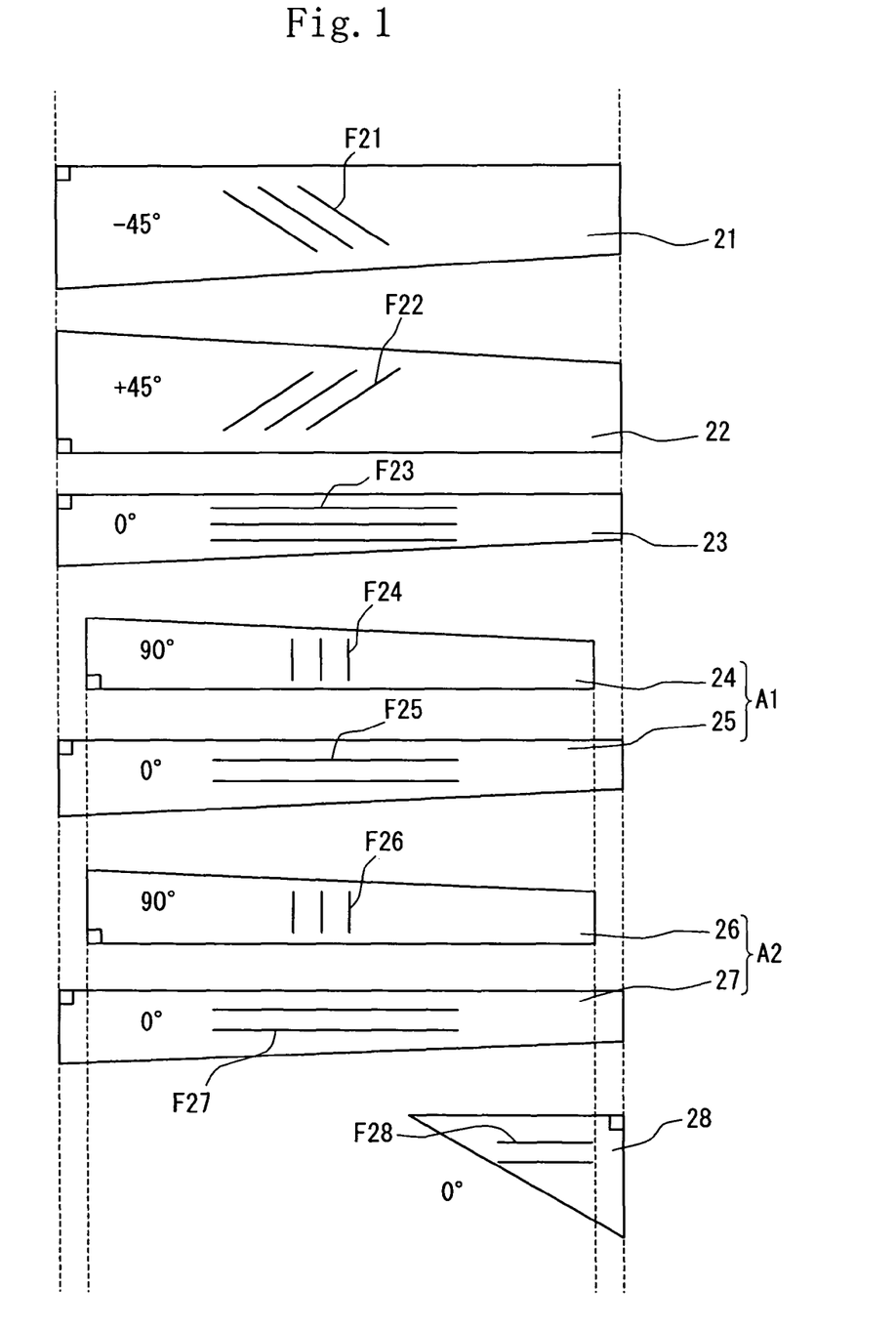
FIG. 1 shows the layered construction of fiber reinforced prepregs of a tubular body, for a golf club shaft, of a first embodiment of the present invention.

The tubular body 10 consists of a tapered laminate of eight fiber reinforced prepregs 20 (21 through 28). Both end portions of the tubular body 10 are circumferentially cut in a necessary length to produce a shaft 10' as an end product.

Figure 2:
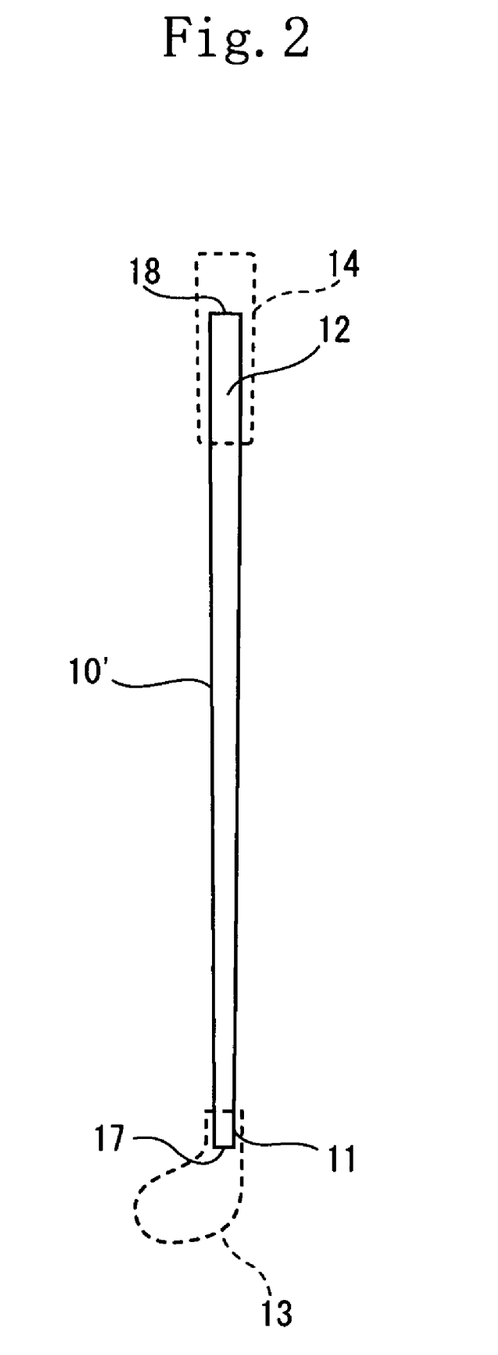
FIG. 2 is a schematic view of a golf club shaft which is an end product of the tubular body.

As shown in FIG. 2, a head 13 is mounted on a head-side tip 11 of the shaft 10' having the smaller diameter, and a grip 14 is mounted on a grip-side butt 12 thereof having the larger diameter.

In this embodiment, the full length of the shaft 10 is set to 1130 mm. The length of the tubular body 10 is set to 1168 mm which is longer than that of the shaft 10'.

Carbon fiber is used as the reinforcing fibers F21 through F28 of the fiber reinforced prepregs 20 (21 through 28), and epoxy resin is used as the matrix resin thereof.

More specifically, as shown in FIG. 1, first and second fiber reinforced prepregs consist of bias prepregs 21, 22. The orientation angle of the reinforcing fiber F21 of the bias prepreg 21 and that of the reinforcing fiber F22 of the bias prepreg 22 are set to −45 degrees and +45 degrees respectively to the axis of the tubular body 10. The length of each of the bias prepregs 21, 22 is set equally to the full length of the tubular body 10. The width of each of the bias prepregs 21, 22 at the head side of the tubular body 10 and at the grip side thereof are set to 50 mm and 100 mm respectively. The thickness of each of the bias prepregs 21, 22 is set to 0.085 mm. The resin content of each of the bias prepregs 21, 22 is set to 24%. The tensile modulus of elasticity of each of the reinforcing fibers F21, F22 is set to 30 ton/mm$^2$.

A third fiber reinforced prepreg consists of a straight prepreg 23. The orientation angle of the reinforcing fiber F23 of the straight prepreg 23 is set to 0° to the axis of the tubular body 10. The length of the straight prepreg 23 is set equally to the full length (1168 mm) of the tubular body 10. The width of the straight prepreg 23 at the head side of the tubular body 10 and the grip side thereof are set to 26 mm and 52 mm respectively. The thickness of the straight prepreg 23 is set to 0.082 mm. The resin content of the straight prepreg 23 is set to 24%. The tensile modulus of elasticity of the reinforcing fiber F23 is set to 24 ton/mm$^2$.

A fourth fiber reinforced prepreg consists of a hoop prepreg 24. The orientation angle of the reinforcing fiber F24 of the hoop prepreg 24 is set to 90° to the axis of the tubular body 10. The length of the hoop prepreg 24 is set to 1128 mm. The width of the hoop prepreg 24 at the head side of the tubular body 10 and that at the grip side thereof are set to 28 mm and 52 mm respectively. The thickness of the hoop prepreg 24 is set to 0.034 mm. The resin content of the hoop prepreg 24 is set to 40%. The tensile modulus of elasticity of the reinforcing fiber F24 is set to 30 ton/mm$^2$.

A fifth fiber reinforced prepreg consists of a straight prepreg 25. The orientation angle of the reinforcing fiber F25 of the straight prepreg 25 is set to 0° to the axis of the tubular body 10. The length of the straight prepreg 25 is set equally to the full length of the tubular body 10. The width of the straight prepreg 25 at the head side of the tubular body 10 and at the grip side thereof are set to 27 mm and 53 mm respectively. The thickness of the straight prepreg 25 is set to 0.103 mm. The resin content of the straight prepreg 25 is set to 24%. The tensile modulus of elasticity of the reinforcing fiber F25 is set to 24 ton/mm$^2$.

The fourth fiber reinforced prepreg, namely, the hoop prepreg 24 is beforehand integrated with the straight prepreg 25, namely, the fifth fiber reinforced-prepreg. A laminate A1 is constructed of the hoop prepreg 24 and the straight prepreg 25, serving as a base prepreg, on which the hoop prepreg 24 is layered. The length of the layered-hoop prepreg 24 is set to 1128 mm. The length of the straight prepreg 25 is set to 1168 mm. Both ends of the layered-hoop prepreg 24 in its longitudinal direction is disposed inward from both ends of the straight prepreg 25 in its longitudinal direction.

A sixth fiber reinforced prepreg consists of a hoop prepreg 26. The orientation angle of the reinforcing fiber F26 of the hoop prepreg 26 is set to 90° to the axis of the tubular body 10. The length of the hoop prepreg 26 is set to 1128 mm. The width of the hoop prepreg 26 at the head side of the tubular body 10 and at the grip side thereof are set to 29 mm and 53 mm respectively. The thickness of the hoop prepreg 26 is set to 0.034 mm. The resin content of the hoop prepreg 26 is set to 40%. The tensile modulus of elasticity of the reinforcing fiber F26 is set to 30 ton/mm$^2$.

A seventh fiber reinforced prepreg consists of a straight prepreg 27. The orientation angle of the reinforcing fiber F27 of the straight prepreg 27 is set to 0° to the axis of the tubular body 10. The length of the straight prepreg 27 is set equally to the full length of the tubular body 10. The width of the straight prepreg 27 at the head side of the tubular body 10 and at the grip side thereof are set to 28 mm and 54 mm respectively. The thickness of the straight prepreg 27 is set to 0.082 mm. The resin content of the straight prepreg 27 is set to 24%. The tensile modulus of elasticity of the reinforcing fiber F27 is set to 24 ton/mm$^2$.

The sixth fiber reinforced prepreg, namely, the hoop prepreg 26 is beforehand integrated with the straight prepreg 27, namely, the seventh fiber reinforced prepreg. A laminate A2 is constructed of the hoop prepreg 26 and the straight prepreg 27, serving as a base prepreg, on which the hoop prepreg 26 is layered. The length of the layered-hoop prepreg 26 is set to 1128 mm. The length of the straight prepreg 27 is set to 1168 mm. Both ends of the layered-hoop prepreg 26 in its longitudinal direction is disposed inward from both ends of the straight prepreg 27 in its longitudinal direction.

An eighth fiber reinforced prepreg consists of a straight prepreg 28. The orientation angle of the reinforcing fiber F28 of the straight prepreg 28 is set to 0° to the axis of the tubular body 10. The length of the straight prepreg 28 is set to 250 mm. The width of the straight prepreg 28 at the head side of the tubular body 10 and at the grip side thereof are set to 100 mm and 0 mm respectively. Thus the straight prepreg 28 is triangular. The thickness of the straight prepreg 28 is set to 0.082 mm. The resin content of the straight prepreg 28 is set to 24%. The tensile modulus of elasticity of the reinforcing fiber F28 is set to 24 ton/mm$^2$.

The method for producing the tubular body 10 is described below.

The tubular body 10 is produced by using a sheet winding method.

Figure 3:
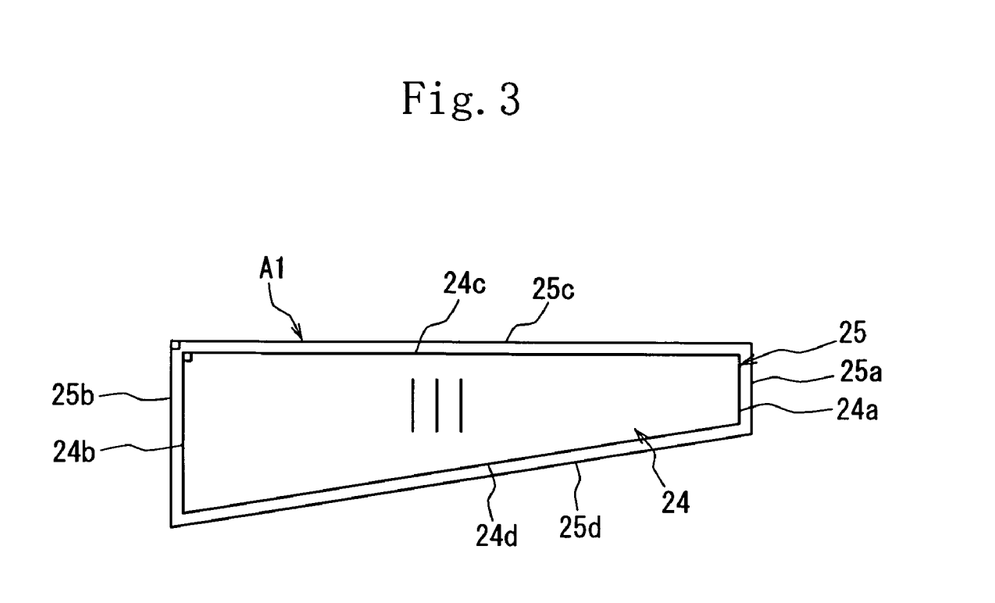
FIG. 3 is a plan view showing a layered-hoop prepreg that is layered on a base prepreg.

Before the prepregs are layered one upon another by winding them round a core (mandrel), as shown in FIG. 3, the hoop prepreg 24 is adherently layered on the straight prepreg 25 serving as the base prepreg in advance to form the laminate A1. Similarly the hoop prepreg 26 is adherently layered on the straight prepreg 27 serving as the base prepreg in advance to form the laminate A2.

Figure 4:
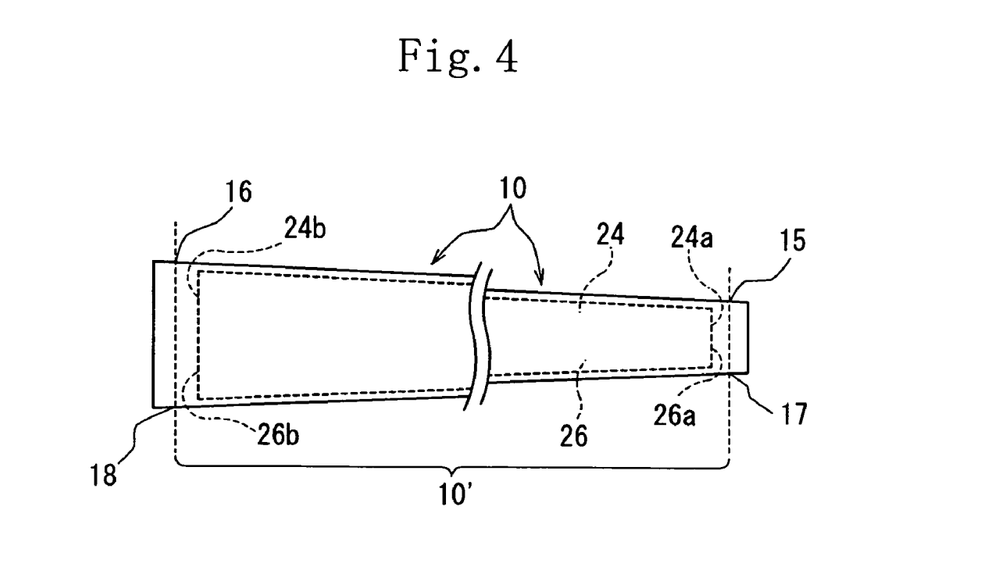
FIG. 4 is a plan view showing both ends of the tubular body.

As shown in FIG. 3, in forming the laminate A1, both edges 24a, 24b of the hoop prepreg 24 in the axial direction of the tubular body 10 are disposed inward by 20 mm from both edges 25a, 25b of the straight prepreg 25 serving as the base prepreg in the axial direction of the tubular body 10. An initial edge 24c and a termination edge 24d of the hoop prepreg 24 in the hoop prepreg-winding direction thereof are disposed inward at an interval of 1 mm from an initial edge 25c and a termination edge 25d of the straight prepreg 25 in the hoop prepreg-winding direction thereof. As shown in FIG. 4, both edges 24a, 24b of the hoop prepreg 24 are disposed inward at an interval of 10 mm from both both-end cut positions 15, 16 of the tubular body 10. Both the hoop prepreg 24 and the straight prepreg 25 are bonded to each other with both prepregs placed in position.

In forming the laminate A2, the hoop prepreg 26 and the straight prepreg 27 serving as the base prepreg are bonded to each other with the peripheral edge of the hoop prepreg 26 disposed inward from the peripheral edge of the straight prepreg 27 and from final cut positions 15, 16 of the tubular body 10. In this manner, both hoop prepreg 26 and the straight prepreg 27 are integrated with each other.

After the laminates A1, A2 are formed, the prepregs 20 (21 through 28) are sequentially wound round the core (not shown).

After the bias prepregs 21, 22 and the straight prepreg 23 are sequentially wound round the core, the laminate A1 is wound round the core with the hoop prepreg 24 disposed inward from the straight prepreg 25. Thereafter the laminate A2 is wound round the core with the hoop prepreg 26 disposed inward from the straight prepreg 27.

Finally the straight prepreg 28 is layered on the laminate A2 by winding it round the core at the head-side tip of the tubular body 10.

Thereafter the surface of the laminate composed of the prepregs 21 through 28 is wrapped with a tape made of polyethylene terephthalate or the like. Thereafter the laminate is heated in an oven under pressure to harden the resin so as to integrally form the prepregs 21 through 28. Thereafter, the mandrel is drawn out of the laminate. In this manner, the tubular body 10 is formed.

As described above, in the process of manufacturing the tubular body 10, the hoop prepregs 24, 26 are wound round the core not singly but in the form of the laminates A1, A2 composed of the straight prepregs 25, 27 and the hoop prepregs 24, 26 adherently layered on the straight prepregs 25, 27 respectively. Thus it is possible to easily wind the hoop prepregs 24, 26 round the core without increasing the number of turns of the straight prepregs 25, 27 and prevent the hoop prepregs 24, 26 from being defectively adherently layered on the straight prepregs 25, 27 respectively. Thus it is possible to prevent hoop prepregs 24, 26 from peeling off the straight prepregs 25, 27 respectively without increasing the weight of the tubular body 10.

In the laminates A1, A2, the hoop prepregs 24, 26 are so disposed that they do not project from the peripheral edge of the straight prepregs 25, 27 serving as the base prepregs. Therefore the straight prepregs 25, 27 are allowed to display the anchoring effect thereof to a high extent, and the hoop prepregs 24, 26 can be prevented securely from peeling off the straight prepregs 25, 27 respectively.

The edges 24a, 26a of the hoop prepregs 24, 26 in the axial direction of the tubular body 10 and the edges 24b, 26b of the hoop prepregs 24, 26 in the axial direction of the tubular body 10 are disposed inward from both-end cut positions 15, 16 of the tubular body 10 respectively. Therefore the edges 24a, 26a of the hoop prepregs 24, 26 in the axial direction of the tubular body 10 and the edges 24b, 26b of the hoop prepregs 24, 26 in the axial direction of the tubular body 10 do not appear at both edges 17, 18 of the shaft 10' which is the end product of the tubular body 10, but adhered portion of each of the straight prepregs 25, 27 is interposed between the edge 17 of the shaft 10' and the edges 24a, 26a of the hoop prepregs 24, 26 and between the edge 18 of the shaft 10' and the edges 24b, 26b of the hoop prepregs 24, 26. Thereby it is effectively prevent the hoop prepregs 24, 26 from peeling off the straight prepregs 25, 27 respectively at both edges 17, 18 of the shaft 10' where the hoop prepregs 24, 26 are liable to do so.

The thickness of the hoop prepregs 24, 26 is set to the range from 0.03 to 0.06 mm, and the tensile modulus of elasticity of the reinforcing fibers F24, F26 are set to the range from 30 to 80 ton/mm$^2$. Therefore it is possible to provide the hoop prepregs 24, 26 with the crushing rigidity/the strength and the easiness in winding the hoop prepregs 24, 26 in a favorable balance.

All of the hoop prepreg 24 and the straight prepreg 25 constructing the laminate A1 and the hoop prepreg 26 and the straight prepreg 27 constructing the laminate A2 have the resin content in the range from 30 to 40%. Therefore the hoop prepregs 24, 26 are allowed to be adherently layered at a high force on the straight prepregs 25, 27 respectively. Thereby it is possible to prevent the hoop prepregs 24, 26 from peeling off the straight prepregs 25, 27 respectively and restrain the weight of the tubular body 10 from increasing.

EXAMPLES

To confirm the above-described construction, operation, and effect of the tubular body, the tubular body, for the golf club shaft, of an example 1 of the present invention and the tubular body of a comparison example 1 are described in detail below. Although the effect of the present invention is clarified in the example, the scope of the present invention is not limited based on the description of the example.

The method for producing the tubular body of the example 1 and that for producing the tubular body of the comparison example 1 were different from each other in only the method of winding the hoop prepreg round the core. The tubular bodies were evaluated as to whether the hoop prepreg defectively adherently layered on the straight prepreg.

The fibrous angle and configuration of the fiber reinforced prepreg used in the example 1 and those used in the comparison example 1 were set identically to those of the embodiment 1. That is, the tubular body was produced in the sheet winding method carried out by winding the bias prepregs 21, 22, the straight prepreg 23, the hoop prepreg 24, the straight prepreg 25, the hoop prepreg 26, the straight prepreg 27, and the straight prepreg 28 round the core. The full length and weight of the tubular body of the example 1 and the comparison example 1 were set to 1168 mm and 45 g respectively.

The specification of the prepregs 21 through 28 of the tubular body of the example 1 and that of the prepregs 21 through 28 of the tubular body of the comparison example 1 were identical to each other. More specifically, prepregs produced by Toray Industry Inc. were used as the prepregs 21 through 28, the reinforcing fibers of which were made of carbon fibers. The detail of the prepregs 21 through 28 is as shown in table 1:

In the bias prepregs 21, 22, the kind of fiber: M30S, the kind of resin: #2521R, the tensile modulus of elasticity of the fiber: 30 ton/mm$^2$, the thickness: 0.085 mm, and the resin content (weight ratio in prepreg): 24%.

In the straight prepreg 23, the kind of fiber: T700G, the kind of resin: #2521R, the tensile modulus of elasticity of the fiber: 24 ton/mm$^2$, the thickness: 0.082 mm, and the resin content: 24%.

In the hoop prepregs 24, 26, the kind of fiber: M30S, the kind of resin: #2500, the tensile modulus of elasticity of the fiber: 30 ton/mm$^2$, the thickness: 0.034 mm, and the resin content (weight ratio in prepreg): 40%.

In the straight prepreg 25, the kind of fiber: T700G, the kind of resin: #2521R, the tensile modulus of elasticity of the fiber: 24 ton/mm$^2$, the thickness: 0.103 mm, and the resin content: 24%.

In the straight prepregs 27, 28, the kind of fiber: T700G, the kind of resin: #2521R, the tensile modulus of elasticity of the fiber: 24 ton/mm$^2$, the thickness: 0.082 mm, and the resin content: 24%.

Example 1

The method of winding the hoop prepregs 24, 26 was identical to that of the first embodiment. More specifically, the hoop prepreg 24 was adherently layered on the straight prepreg 25 serving as the base prepreg in advance to form the laminate A1. The hoop prepreg 26 was adherently layered on the straight prepreg 27 serving as the base prepreg in advance to form the laminate A2.

The prepregs 21, 22, 23, the laminates A1, A2, and the prepreg 28 were sequentially wound round the core. After the laminates A1 and A2 were so bonded to each other that the hoop prepreg 24 of the laminate A1 and the hoop prepreg 26 of the laminate A2 did not project from the peripheral edge of the straight prepregs 25, 27 serving as the base prepregs respectively, the laminates A1 and A2 were wound round the core with the hoop prepregs 24, 26 disposed inward from the straight prepregs 25, 27 respectively.

Comparison Example 1

The prepregs 21 through 28 were sequentially wound round the core in the order from the prepreg 21 to the prepreg 28. The hoop prepregs 24, 26 were singly wound round the core.

Evaluation of Adherence of Hoop Prepreg to Base Prepreg 50 tubular bodies of the example 1 and the comparison example 1 were produced. In the process of producing them, after each prepreg was wound round the core, the wound state thereof was visually checked as to whether the edge thereof was defectively adherently layered on the base prepreg, i.e., whether the edge thereof lifted from a lower layer (base layer). After a prepreg-adhering work was performed again for a prepreg defectively adherently layered on the base prepreg, a subsequent prepreg was wound round the core. In this manner, all prepregs of each tubular body were wound round the core.

In the evaluation, no defective adhering of the prepregs was found in all of the 50 tubular bodies of the example 1. On the other hand, in 13 of the 50 tubular bodies of the comparison example 1, defective adhering was found in the winding of the hoop prepregs 24 and/or the hoop prepreg 26.

What is claimed is:

1. A method for producing a tubular body comprising a laminate of prepregs each consisting of a matrix resin and reinforcing fibers impregnated with said matrix resin, said method including a step of winding round a core bias prepregs in which orientation directions of reinforcing fibers incline to an axis of said tubular body, winding straight prepregs in which orientation directions of reinforcing fibers are parallel with said axis of said tubular body, and hoop prepregs in which orientation directions of reinforcing fibers are disposed perpendicularly to said axis of said tubular body, wherein at said winding step, after at least one of said hoop prepregs is adherently layered in advance on at least one base prepreg consisting of one of said bias prepregs or one of said straight prepregs to form one or more laminates, at least one of said laminates is wound on said core so that at least one of said hoop prepregs is wound on said core integrally with at least one of said base prepregs, and wherein in the step of the at least one of said laminates, both edges of the least one of the hoop prepregs, which is adherently layered on the least one of base prepregs, in the axial direction of the tubular body, an initial edge and a termination edge of the least one of hoop prepregs in a hoop prepreg-winding direction are disposed inward from a peripheral edge of the least one of base prepregs, and the both edges of the least one of hoop prepregs in the axial direction of the tubular body are disposed inward from final cut positions which are position of both ends of the tubular body in the axial direction.

* * * * *